United States Patent [19]

Brown

[11] Patent Number: 4,474,439

[45] Date of Patent: Oct. 2, 1984

[54] CAMERA SUPPORT

[76] Inventor: Garrett W. Brown, 515 Addison Ct., Philadelphia, Pa. 19147

[21] Appl. No.: 342,779

[22] Filed: Jan. 26, 1982

[51] Int. Cl.³ ............................................. G03B 17/00
[52] U.S. Cl. ..................................... 352/243; 354/293
[58] Field of Search ............... 352/243; 248/280, 281; 354/81, 82, 293

[56] References Cited

U.S. PATENT DOCUMENTS

| | | |
|---|---|---|
| 817,207 | 4/1906 | Wheeler . |
| 1,730,346 | 10/1929 | Beeson et al. .......................... 354/81 |
| 2,007,215 | 7/1935 | Remey . |
| 2,239,201 | 4/1941 | Pyzel . |
| 2,599,269 | 6/1952 | Markle .................................. 354/81 |
| 2,636,822 | 4/1953 | Anderson . |
| 2,806,416 | 9/1957 | Jones . |
| 2,945,428 | 7/1960 | Dearborn . |
| 2,990,764 | 7/1961 | Wilder .................................. 354/81 |
| 3,332,593 | 7/1967 | Fauser . |
| 3,952,982 | 4/1976 | Lewis .................................... 354/81 |
| 4,017,168 | 4/1977 | Brown . |
| 4,158,488 | 6/1979 | Gottschalk et al. . |
| 4,158,489 | 6/1979 | Gottschalk et al. . |
| 4,158,490 | 6/1979 | Gottshalk et al. ................... 352/243 |
| 4,206,983 | 6/1980 | Nettman et al. ..................... 352/243 |
| 4,208,028 | 6/1980 | Brown et al. . |

FOREIGN PATENT DOCUMENTS

| | | |
|---|---|---|
| 2248379 | 4/1974 | Fed. Rep. of Germany . |
| 2914219 | 11/1979 | Fed. Rep. of Germany ...... 352/243 |

Primary Examiner—Monroe H. Hayes
Attorney, Agent, or Firm—Weiser & Stapler

[57] ABSTRACT

The camera support includes an upright tubular body to which a gimbal and a plurality of auxiliary pieces of camera equipment such as a video monitor, an electronics package, a battery or a recorder can be vertically adjustably mounted in an expanded balanced arrangement. Some of these components are also circularly adjustable about the vertical body in response to various clearance requirements and the necessities of certain types of shooting. Certain components can be mounted to the tubular body in an inverted position to facilitate "low mode" operation in which the camera body is the lowest component of the camera equipment, and is adapted to be dependent from the camera mounting plate.

46 Claims, 13 Drawing Figures

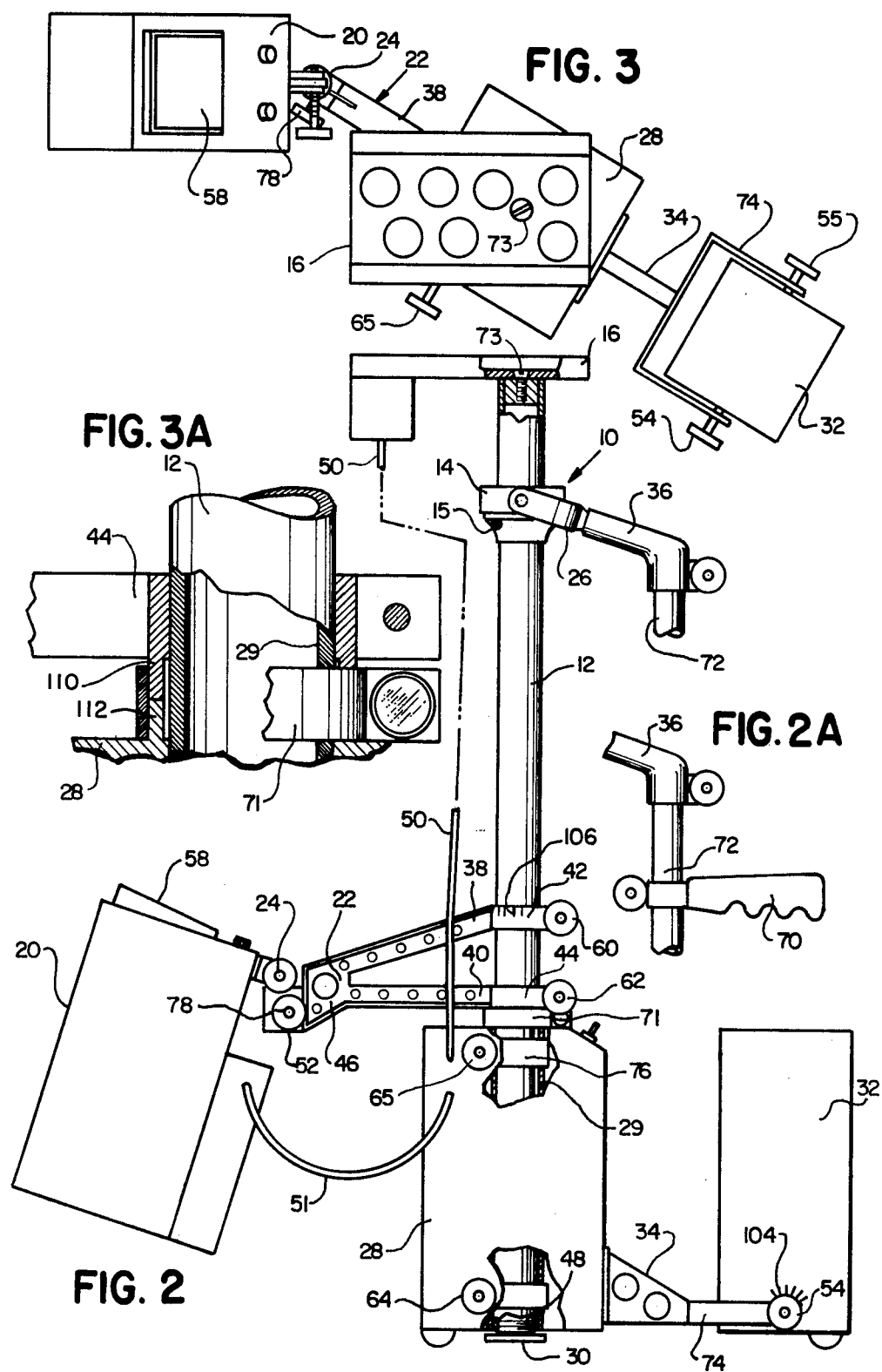

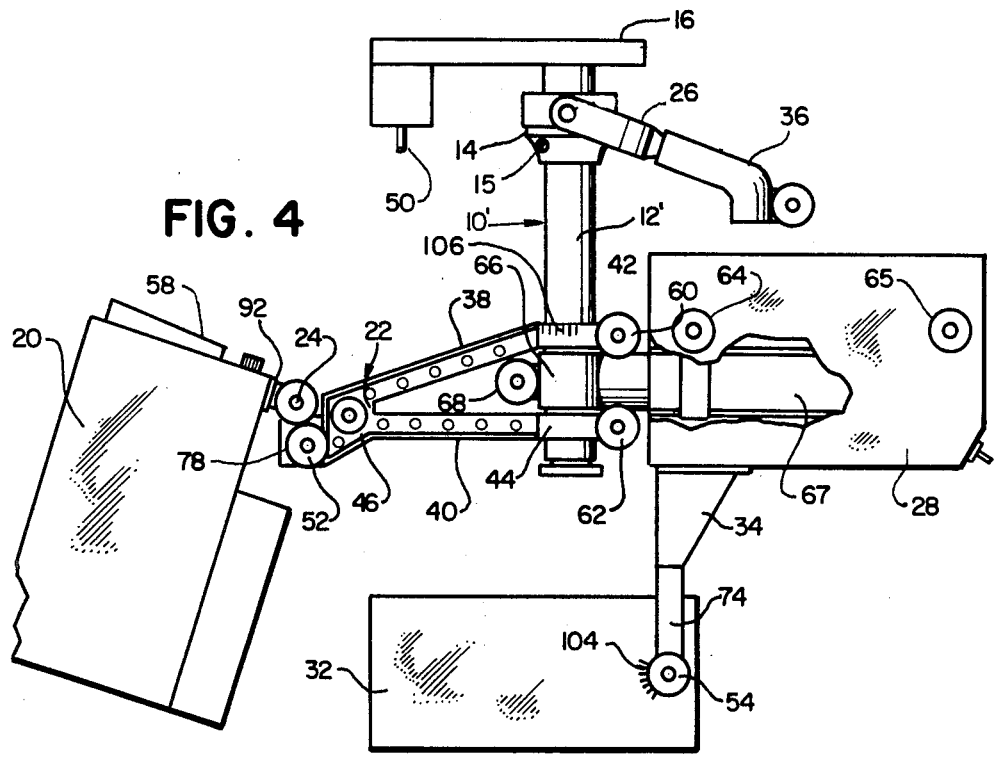
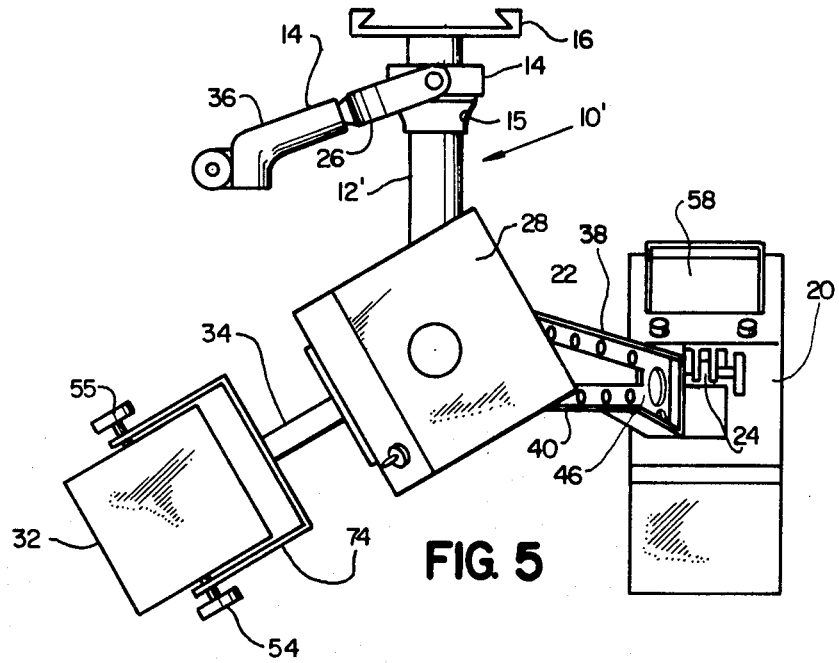

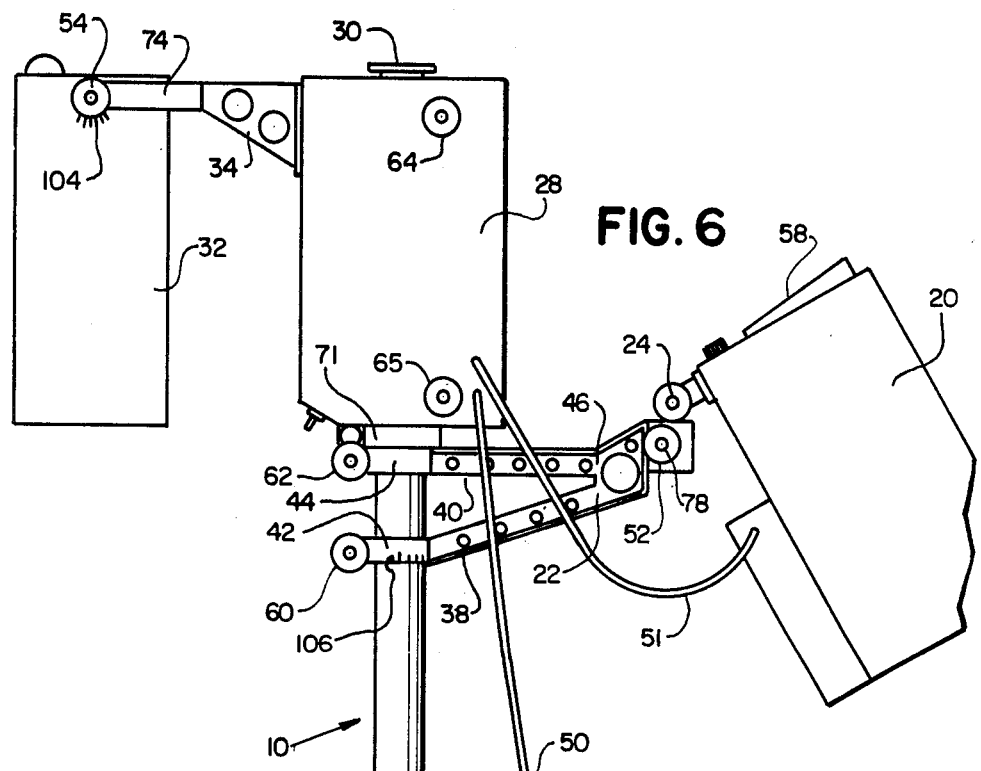
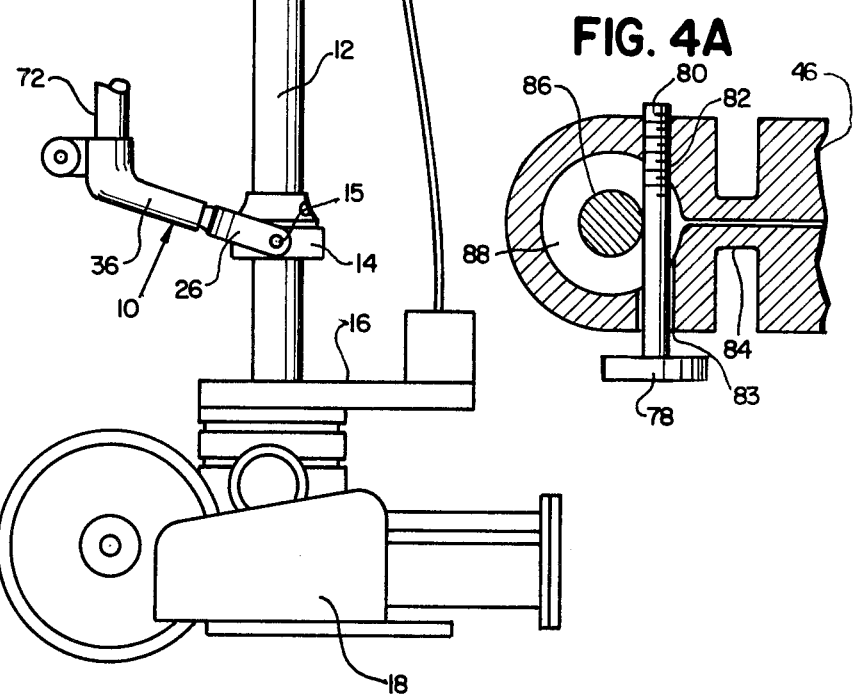

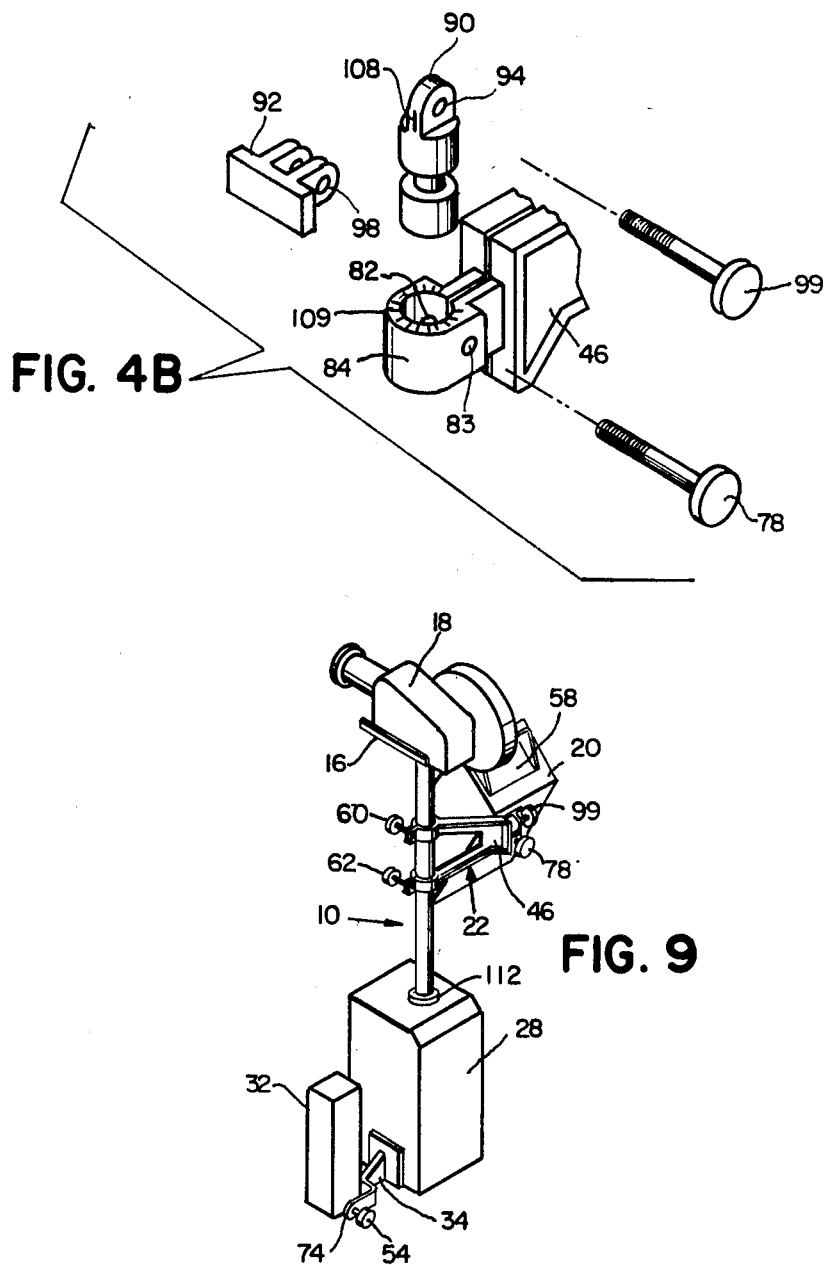

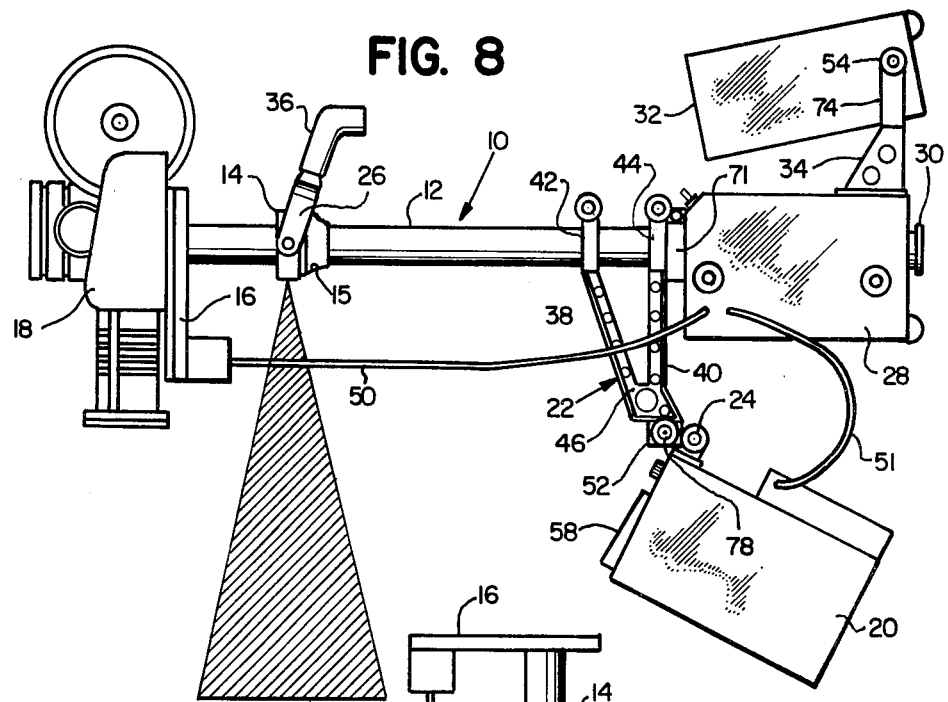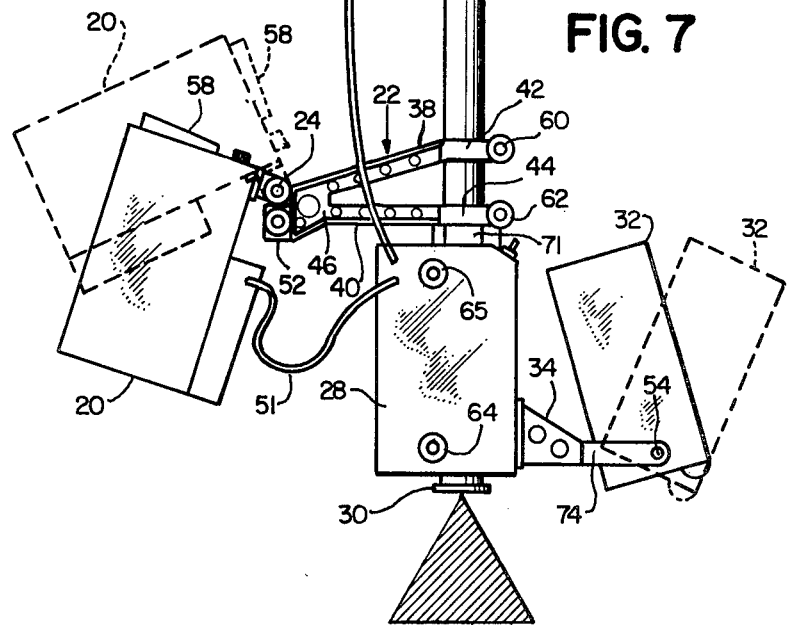

CAMERA SUPPORT

BACKGROUND OF THE INVENTION

The present invention relates generally to the field of film or video camera equipment supports, and more particularly, is directed to a readily adjustable support suitable for use with various types of resilient equipoising mechanisms, such as the interconnected, spring-loaded arms of some operator-carried camera stabilizing systems.

Camera supports and camera stabilizing systems of the general type forming the subject matter of the present invention have increased in popularity and utilization over the past several years. Such systems have become an accepted additional tool to provide a higher quality of results than previously possible with hand-held film or video cameras when site limitations render the use of a conventionally dolly mounted camera too expensive, restrictive or time consuming. U.S. Pat. No. 4,017,168 to Brown and U.S. Pat. No. 4,208,028 to Brown and DiGiulio are illustrative of the type of camera stabilizing systems that are currently available. One popular camera stabilizing system licensed under U.S. Pat. No. 4,017,168 is currently being manufactured and sold by Cinema Products Corporation, Los Angeles, Calif., under the trademark "STEADICAM". The support arm constructions of these patents are herein incorporated by reference. Another system, also licensed under U.S. Pat. No. 4,017,168, is called "PANA-GLIDE" and is available for rent from Panavision, Inc. of Tarzana, Calif. While these systems have been extensively employed, and have generally achieved the desired purpose of greatly improving the quality of hand-held cinematography, the configuration and construction of the camera equipment support elements of these presently available types have not proved equal to the continuous advance in the versatility of the art and the technical skill of the best operators now using the equipment.

Operators are now routinely called upon to do a great deal more than the relatively straightforward running and stair-climbing shots of five years ago. A recent scene designed for the "STEADICAM" system, for instance, required the operator to cross a yard, climb porch stairs, and enter a house ahead of an actor and actress, get behind them as they have an elaborate argument while moving rapidly through a dining room and kitchen, precede" them into the living room, climb upon a hidden elevator which lifts the operator up through a hole in the ceiling to the second floor as they climb the stairs, follow them at high speed into their bedroom and narrow bathroom, precede them back out the hall, jump on the elevator for the ride down as they descend the stairs, circle them twice as they embrace in the living room, back slowly out the door, down the steps, across the walk, step onto a crane and ride slowly up and back for a steady one minute hold for end titles. (Length of scene: four-and-a-half minutes.) This type of shot can perhaps be accomplished (with some difficulty) by a skilled operator using the presently available equipment, but certainly would have been considered impossible just a few years ago. In order to obtain such shots, compromises must sometimes be made because of the limitations of the present equipment. Since the heaviest 35 mm silent cameras are now routinely employed (weighing as much as forty pounds with a super-speed lens), a design which could permit lighter construction of the camera support itself would ease the operator's burden and allow him greater endurance. Also, at times, the operator and his assistant must stop shooting in order to perform elaborate and time consuming modifications to the equipment, some of which were not contemplated in the original design, and which are therefore arbitrarily difficult to accomplish. If the operator wishes to shoot in the so called "low mode" with a lens height in the range between knee and waist, he is required to switch the components around and re-balance them with the camera body now hanging from the bottom of the support.

Operators now are frequently required to execute the most complicated and demanding shots within close quarters on location interiors, and the fact that the battery projects rearwardly, and the electronics package projects forwardly on the models presently available, means that during an actual pan of the camera from side to side, the support must be held at a distance sufficiently removed from the camera operator's body to permit clearance between himself and the battery, and he must be continually conscious of the projection forward of the electronics in order not to bump into objects on the set.

If space requirements become particularly tight, such as in a helicopter or automobile interior, the operator's only recourse is to rearrange the "STEADICAM" system components into its "compact vehicle mode" by using a ball and socket provided in place of the gimbal, mounted close under the camera body, and which therefore permits the electronics and battery to be balanced nearer to the camera body (thus taking up less room top-to-bottom.) This mode requires a nearly complete disassembly of the support, and considerably restricts the operator's view of the monitor screen, as it is partially hidden under the camera mounting plate. Also problems have arisen because the ball and socket is never as freely movable as a proper gimbal, and therefore, some of the angular motions of the cameraman may get through to the camera lens.

Even in conventional operation, additional problems occur if the operator is required to tilt up drastically. The ability of the monitor to tilt correspondingly and therefore to remain visible to the operator, has been either non-existant or severely limited by the structure of the existing monitor housing bracket.

Finally, it is sometimes desirable to shoot with the camera pointing to the rear, while maintaining the position of the monitor in front of the operator, so he can face forward as he moves. In the past, it has been necessary to stop shooting, and remount some or all of the components, and rebalance them in order to accomplish this.

SUMMARY OF THE INVENTION

The present invention relates generally to the field of operator-carried camera stabilizing supports, and more particularly, is directed to an improved camera support of universal adjustability.

As used herein the terms "video monitor" or "TV monitor" are intended to mean any such electronic viewfinding screens as now exist or as may be devised in the future. Also, the term "camera" is intended in its broadest sense to include any type of portable equipment which calls for pointing or aiming by an operator.

The camera equipment of the present invention comprises generally a hollow, tubular, central, upright body of suitable length to adjustably carry the various components and auxiliary equipment necessary for use in operator-carried film/video camera systems. The tubular body terminates upwardly in a removably attached mounting plate to which the camera body itself can be secured in a known manner.

In one configuration, the supporting gimbal is provided with a connecting ring of size to overfit and to slide upwardly upon the tubular body toward the mounting plate for securing to said body at a position slightly above the center of gravity of the total mass of the camera support after the camera body and all of the auxiliary components are mounted. The gimbal can be equipped with a curved flange to physically define the upper limits of the hand operating area on the tube and help guide the thumb and finger to be positioned over the exact center of gravity of the mass of the expanded camera components.

A TV monitor or electronic viewfinder screen pivotably and rotatably connects to a bracket having a connecting split ring or rings for affixing to the tubular body below the gimbal handle. The monitor is pivotal in a vertical plane about the bracket and rotatable around the end of the bracket, and the bracket is rotatable in a horizontal plane about the tubular body so it can be adjusted to the most convenient angle as determined by the operator.

In the preferred embodiment, the electronics package is arranged in an annular configuration including a central bore of size to overfit and slide upwardly upon the tubular body for securing thereto below the TV monitor bracket. In one configuration, the battery can be vertically oriented and provided with a short bracket for affixing to the outer periphery of the electronics package in a manner to greatly reduce the front to rear dimensions of the camera support. The battery may also be provided with mounting means for direct connection to the tubular body.

In one alternate embodiment, for working in tight spaces of vehicles, the tubular body can be provided of shortened length in a configuration wherein the center of gravity is located immediately below the camera mounting plate, and wherein the gimbal is adjusted to be positioned approximately over this center of gravity.

It is noteworthy that in both the long and short configurations, the TV monitor bracket, the electronics package and the battery mounting bracket are arranged for independent rotation about the central tubular body relative to the camera itself. Accordingly the TV monitor may be rotated in a manner so that it may be separately oriented at the operator's convenience from the orientation of the camera.

Additionally, because of the vertical adjustability of all of the auxiliary components relative to the tubular body, low mode shots, rear shots, and other shots which previously were difficult because of space limitations can now be more easily accomplished by suitably arranging the various components vertically and rotatively relative to the vertical body.

An additional floating clamp can be positioned on the tubular body to clamp together the split lower ring of the monitor bracket and the topmost flange on the electronics package. Once connected together, these components can be loosened from the tubular body and the camera can therefore be panned independently of the monitor/battery. This permits the operator to suddenly shoot to the rear while continuing to look forward.

Because there is only one rigid central structural element, the equipment of the present invention can be constructed to weigh less than the presently available versions and yet be even more rigid. It can solve or eliminate all of the above-mentioned difficulties, and in addition provides some additional benefits not anticipated by the present art. For instance, the monitor and battery can be deployed in a balanced arrangement that is axially removed from the orientation of the camera body by as much as ninety degrees, so that an operator can ride on the back seat of a car with the camera pointing forward, and the lower components of the camera equipment disposed from side-to-side within the space behind the front seat. This could permit, for instance, the monitor to be over his lap, yet adjusted to be aimed in parallel alignment with the camera, while the electronics and battery are down behind the seat and beside his legs.

Low mode operation is facilitated by the easily inverted monitor mounting. The present invention also provides a superior adjustability and visibility for the monitor screen.

In close quarters, the lack of forwardly projecting electronics and the improved compactness of the battery mounting, provides for easier operation closer to the operator's body, and in closer proximity to objects on the set.

The new configuration for the "compact vehicle mount" provides improved results, and reduced changeover time. The original gimbal is employed, so there is less modification required, and the monitor can be adjusted to be far more visible.

Many aspects of normal operation are also improved by the increased adjustability of the monitor and battery and some exotic new possibilities now result. The most dramatic example is perhaps the ability of the present invention to be set up and balanced so that the camera can actually be panned to the rear independently of the monitor and battery—during an actual shot—and back again! This feature provides additional capability for the execution of complex "single-take" scenes, which might previously have had to be broken into separate shots because the operator had to stop to remount the camera to the rear in order to shoot backward, yet watch the monitor while walking forward.

One of the new operating techniques which has found favor among many operators, calls for the use of both hands in order to separate the requirements of aiming the camera and positioning the camera in space. The hand not used to aim the camera is used to position and steady the arm or support mechanism which comprises the carrying system. The use of this other hand in no way diminishes the steadiness of the image, since it is employed on the operator's rather than the camera's side of the gimbal. In fact it frequently augments the stabilizing function of the invention because it permits a lighter touch with the "aiming hand" during booming moves up and down and during translational moves side to side. It is even beneficial during shots which are required to be held steadily in one position for long periods before getting underway. Here the hand holding the arm defines the camera's height and position in space; and, if trimmed properly fore-and-aft, the camera hangs in the gimbal with exactly the correct degree of tilt and of course has no inclination to pan, so it can hold a perfectly rock-steady shot because if its minimal contact with the operator's guiding hand.

The present invention provides an adjustable handle, which can be removably attached to the mounting post on the operator's side of the gimbal, and which can be used to facilitate the fine control of the arm's height and position by the other hand. This is also useful for vehicle shots for which the arm or equipoising mechanism is mounted directly to the vehicle and serves to isolate the camera support from the vehicle's motions without the operator having to wear the equipment. In these cases, the two-handed technique described above has been found to be nearly indispensable.

The apparatus of the present invention may also be employed to support other mobile pieces of equipment wherein stability is essential or desirable and wherein substantial isolation from the operator may be useful, for example, when operating certain types of hand held military weapons, lasers, etc.

It is therefore an object of the present invention to provide an improved camera support of the type set forth.

It is another object of the present invention to provide a novel camera support which includes a tubular body and adjustable means to secure the various components of auxiliary camera equipment to the body in interchangeable longitudinal arrangement.

It is another object of the present invention to provide a novel camera support comprising an upright, tubular body, a gimbal means secured to the body to attach the body to an equipoising support system, first bracket means to adjustably affix a TV monitor to the tubular body and a second bracket means to support an electronics package and/or additional camera equipment to the tubular body, the first and second means being rotatably adjustable relative to the body.

It is another object of the present invention to provide a novel camera support comprising a tubular body having a camera mounting plate at one end thereof, the tubular body being alternately oriented so that the camera mounting plate can either be the upper terminus or the lower terminus of the body, and a plurality of accessory components being adjustably connectable to the tubular body either below or above the mounting plate depending on the mode of operation.

It is another object of the present invention to provide a novel camera support that is rugged in construction, light in weight, simple in design and fully adjustable when in use.

Other objects and a fuller understanding of the invention will be had by referring to the following description and claims of a preferred embodiment, taken in conjunction with the accompanying drawings wherein like reference characters refer to similar parts throughout the several views, and in which:

BRIEF DESCRIPTION OF THE DRAWINGS

FIG. 2 is an enlarged, side elevational view of the configuration of Fig. 1.

FIG. 2A is a partial, detailed view of FIG. 2, showing an optional handle.

FIG. 3 is a top plan view of the arrangement of FIG. 2 and with the monitor and battery displaced to the side in a balanced relationship that provides the cameraman with a more direct view of the screen.

FIG. 3A is an enlarged, cross sectional view taken along line 3A—3A FIG. 3.

FIG. 4 a side elevational view of a second embodiment of the invention.

FIG. 4A is an enlarged cross sectional view taken along line 4A—4A of FIG. 4.

FIG. 4B is an exploded, isometric view of the parts of FIG. 4A.

FIG. 5 is a rear elevational view of the embodiment of FIG. 4.

FIG. 6 is a side elevational view showing the camera support inverted for low-mode operation.

FIG. 7 is a diagrammatic side elevation showing criteria for balance and trim.

FIG. 8 is another side elevation diagram showing further trimming and balancing operations.

FIG. 9 is a perspective diagrammatic view of the configuration which could increase the risk of precession during violent tilting moves of the camera.

DESCRIPTION OF THE PREFERRED EMBODIMENTS OF THE INVENTION

Figure 1:
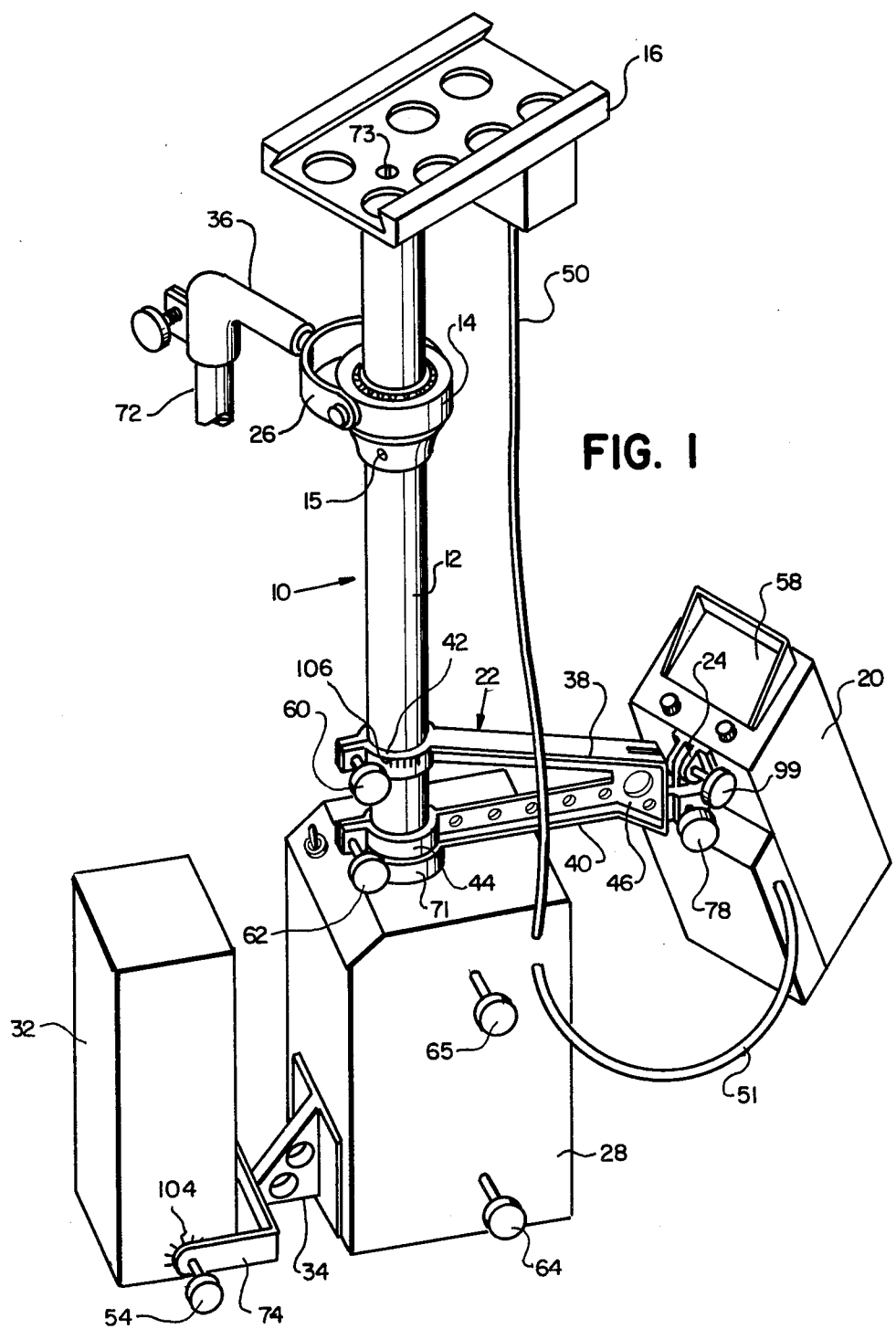
FIG. 1 is a perspective view showing a first embodiment of the present invention.

Although specific terms are used in the following description for the sake of clarity, these terms are intended to refer only to the particular structure of the invention selected for illustration in the drawings and are not intended to define or limit the scope of the invention.

Referring now to the drawings, there is illustrated in FIGS. 1, 2 and 3 a camera support 10 which comprises generally a hollow, tubular, upright body 12 which preferably is fabricated of strong, lightweight metal of a suitable strength and rigidity, such as aluminum or a thin wall steel tubing. The body terminates upwardly in a camera mounting plate 16 of conventional design, which mounting plate can preferably be removably affixed to the tubular body in a secure, known type of mechanical interconnection, such as a mounting screw 73, and which is of suitable strength to releasably secure a video or film camera 18 to the mounting plate 16. The body 12 terminates downwardly in a permanently or removably affixed cap or plug 30, which acts to prevent the components from inadvertently slipping off of the tubular body 12 while being positioned. Optionally, the said tubular body could terminate in a threaded or bayonet type connector which might also facilitate the interconnection of one of the camera system components, or a docking stand (not shown) to permit the equipment to stand upright to be worked on without the danger of falling over.

The electronics package 28 is of known design and is suitable for operation of the camera 18 and the video monitor 20. The electronics package is preferably arranged in an annular configuration including a central bore 29 of size to overfit and slide upwardly upon the tubular body for securing thereto in known manner, for example, by employing one or more split ring clamps 64, 65. The electronics package is adapted to be secured to the body 12 either above or below the TV monitor bracket 22.

A three-axis gimbal 14 of known design is a sliding fit upon the tubular body 12 and can be provided with a set screw 15, or adjustable split ring clamp fastener or other known type of securing device to releaseably affix the gimbal to the body in a preferred location, for example, below the camera mounting plate 16 and slightly above the center of gravity of the system. The gimbal includes a link 36 for connection to the usual mounting post 72 of an equipoising support arm construction (not shown), which may be similar to the support arm and post construction illustrated in U.S. Pat. No. 4,208,028.

A video monitor bracket 22 includes one or more arms 38, 40, which arms preferably are angularly oriented for strengthening purposes. The arms 38, 40 terminate at one end respectively in vertically aligned mounting rings 42, 44 of suitable diameter to slidingly overfit the body 12. The rings 42, 44 are each similarly provided with a locking construction 60, 62 of known design to releasably secure the rings 42, 44 to the body 12 in a desired, vertically oriented position to carry the video monitor 20 in a convenient location for viewing by the operator (not shown). The bracket legs, 38, 40 converge to form a mounting block 46 which comprises a pivotal connection 24 and a rotatable connection 52 to pivotably and rotatably secure the video monitor 20 thereto. It is noteworthy that the video monitor bracket 22 can be circularly adjusted relative to the tubular body 12 by rotating as the bracket 22 about the body 12 and then securing the mounting rings 42, 44 to the body in any desired circularly adjusted position.

Additionally, the monitor 20 may be adjusted by the operator (not shown) to any convenient position relative to the body 12 by longitudinally adjusting the mounting bracket 22 along the length of the body 12 to a position closer to the camera 18 or further from the camera 18 as may be most convenient for the particular shot contemplated. Also, the monitor is pivotal in a vertical plane about the bracket pivot 24 to facilitate better viewing of the image during all degrees of camera tilt. Further, the monitor 20 can be circularly adjusted relative to the bracket 22 in a horizontal plane to a desired position by loosening the rotatable connection 52, rotating the monitor 20 about the bracket 22 and then retightening the connection 52 in a desired circular orientation. Such circular adjustment may be desirable either from the standpoint of positioning the monitor 20 in a more convenient location for viewing in certain shots such as to realign its orientation so as to be parallel with the camera orientation even though bracket 22 has been re-oriented axially relative to the camera; or for purposes of clearance to swing the monitor away from an obstruction which may be in the cameraman's path when working in close quarters.

The body 12 may terminate downwardly in a threaded or bayonet type connector 48 to engage therein the threaded or bayonet type socket of a component, for example, a miniature version of the electronics package 28 which might become available in the future.

In accordance with usual practice in the art, the electronics package 28 can contain all of the electronic circuitry and components necessary to function the camera 18 and the video monitor 20 in a known manner. Flexible electrical cables 50, 51 interconnect the electronics package 28 with the video monitor 20 and the camera 18 in a manner well known to those skilled in the art to provide an easily assembled, properly functioning camera and support system. As illustrated, the electronics package 28 is preferably fabricated to a roughly rectangular or cylindrical configuration to thereby reduce the overall dimensions of the electronics package to allow additional clearance between the camera support 10 and the cameraman, especially when panning.

In this manner, additional front clearance for close shots can be provided and additional rear clearance can be achieved, thereby allowing the cameraman greater flexibility in movement, especially in tight "location" conditions whereby the cameraman can function the camera support system 10 much closer to his body without having any of the system components touch his body. As illustrated, the electronics package 28 is vertically spaced below the camera 18 whereby the camera will be positioned above and the electronics package will be positioned below the center of gravity of the system. In view of the compact, rectangular or cylindrical configuration of the electronics package, and its substantially axial location, slightly reduced inertia of the camera support 10 in pan axis will result and will permit slightly faster panning moves to be started and stopped by the operator, particularly when he uses the greater leverage afforded by the gimbal shaped grasping flange 26.

The battery 32 is illustrated in a vertical orientation to provide additional rearward clearance when panning. As illustrated, the battery 32 can be affixed to the exterior periphery of the electronics package 28 by employing one or more arms 34 with a yoke 74. Alternately the battery arm or arms could be designed to attach directly to the body 12. Preferably, the yoke 74 is provided with pivoting clamps 54, 55 (FIG. 3) which releasably permit the battery to be adjusted pivotally and secured therewith in the orientation desired for additional balance trim or unusual clearance requirements. If a single arm 34 and yoke 74 is employed to attach the battery 32 to the electronics package 28, it may be equipped with a telescoping adjustment means (not shown) to allow a wide latitude of position adjustment of the battery 32 relative to the electronics package 28 or to the body 12. The threaded or bayonet connector 48 and the appropriate plug or cap 30 are fabricated to permit any additional component attached thereon to be rotated relative to the tubular body 12 and to be secured thereto in any circularly adjusted position. A conventional lock nut (not shown) or other suitable fastener may be employed in known manner for this purpose.

Referring to FIGS. 2 and 3A, one additional connecting means or "floating" clamp 71 can be positioned around body 12 between a boss 110 on the lower ring 44 of the monitor bracket 22 and the upper boss 112 of the electronics package 28. This permits the monitor and electronics battery combination to be locked together, but still capable of being unclamped from body 12, so that the camera can be panned to the rear independent of and without rotating the monitor and battery 32. Thus, the operator can retain a clear forward view of the monitor, even when called upon in the middle of a shot to shoot to the rear.

A separate handle 70 (FIG. 2A) may be removably affixed in an adjustable manner to facilitate the use of the operator's other hand to control the height and position in space of the support 10 without influencing its angular orientation, thereby making the job of the hand used to aim the camera much easier (neither hand being shown).

In the configuration illustrated in FIG. 2 it will be noted that the monitor 20, the camera 18 and the battery 32 are all aligned in the same vertical plane, a configuration that will be suitable in most situations. In FIG. 3, however, the monitor 20 and the battery 32 are displaced to either side in a balanced relationship that permits the cameraman (not shown) a more direct view of the screen 58. It will be noted that the monitor 20 has been rotated about its rotatable connection 52 so that it is aligned parallel to the alignment of the camera. It will be appreciated that it is possible to rotate the monitor bracket 22 through a desired arc, up to ninety degrees offset from the camera and, similarly, to rotate the battery 32 relative to the body 12 through a roughly equal but opposite arc, by simply first loosening and then tightening the respective mounting rings 42, 44 and clamps 64, 65. The ability to trim the system by rotating the various components about the body 12 adds a dimension of flexibility not heretofore achievable when employing the rigid interconnections which are now state of the art in the prior art camera support systems.

FIG. 6 shows a side elevation view of the support 10 in the so called "low mode" configuration. When it is desired to utilize the camera support 10 in the low mode, that is with the camera 18 positioned closest to the ground, the configuration can be readily accomplished by inverting the support 10 from the position illustrated in FIGS. 1 and 2, by loosening the connection 52, withdrawing the screw 80, removing and reinverting the monitor 20 and re-inserting it into the opposite opening of connection 52. The screw 80 can then be reinserted and the connection 52 can then be tightened in the desired rotational orientation, whereby the monitor screen 58 will continue to be upwardly facing for easy viewing by the cameraman.

Referring now to FIGS. 4, and 5, a modified camera support 10' (the "compact vehicle mount") is illustrated wherein a modified tubular body 12' is shown in shorter configuration.

In the embodiment of FIGS. 4 and 5, the modified body 12' terminates upwardly in the camera mounting plate 16 in the usual manner. The gimble 14 adjustably overfits the body 12' and is secured thereto in a position slightly above the center of gravity of the system by tightening the mounting ring clamp screw 15 in a well known manner. The video monitor 20 can be mounted upon a monitor bracket 22 wherein its mounting arms 38, 40 slidingly overfit and connect to the body 12' at the mounting rings 42, 44 in a manner similar to that shown in FIG. 2. Adjusting nuts 60, 62 can be employed to tighten the mounting rings 42, 44 in the same manner at a desired vertically adjustable position upon the body 12'.

Still referring to FIG. 4, an additional tubular body 67 of similar diameter to that of the short tubular body 12' is adapted to be mounted offset at a right angles to the body 12'. The body 67 can include a split clamp 66 which is designed for adjustable connection about the body 12' by employing a conventional bolt 68. Accordingly, the electronics package 28 can be secured to the body 67 in any desired laterally adjusted position by loosening the clamps 64, 65 sufficiently to allow the electronics package with attached battery to pivot to the desired position. Loosening the bolt 68 allows the tubular body 67 to rotate around the upright body 12' to position the electronics package in any desired circular orientation. Once positioned, the package can be secured by tightening the bolt 68 in a well known manner. As illustrated, the split clamp 66 is positioned intermediate the upper and lower clamping rings 42, 44 of the video monitor bracket 22. Such a configuration facilitates utilization of a relatively short, modified, tubular body 12'. This would still allow the operator (not shown) to employ the portion of the body 12' exposed below the gimbal flange 26 as a handle for guiding the camera 18 when in use.

As best seen in FIGS. 4A and 4B, the monitor 20 may be secured to the video monitor bracket 22 through a reversible securing system comprising a novel cylindrical link 86 which is rotatable within a split barrel clamp 84. As illustrated, a connector bracket 92 is provided with a pair of spaced lugs having openings 96, 98 therethrough. The bracket 92 secures to the monitor 20 in conventional manner and is provided with a threaded bolt 99 for engaging the link 86. The split barrel clamp 86 affixes to the end of the video monitor bracket 22 and includes a pair of aligned openings 82, 83 for receipt of a threaded bolt 78 therethrough. As illustrated in FIG. 4A, preferably, the opening 82 is tapped to threadedly engage the threaded shank 80 of the bolt 78 whereby the link 86 can be adjustably engaged.

The link 86 is undercut to include a circular groove 88, which groove aligns with the split barrel opening 82, 83. Accordingly, when the link 86 is positioned within the split barrel clamp 84 and the bolt 78 is positioned through the opening 82, 83, the bolt 78 will engage the link 84 construction both above and below the groove 88, thereby providing a positive lock to prevent absolutely any possibility of the inadvertent separation of the monitor 20 from the monitor bracket 22. It is noteworthy that the link 86 inserts downwardly through the top of the split clamp opening 102 in the configuration illustrated in FIGS. 1, 2 and 4. When the bracket 22 is reversed, as in FIG. 6, the link 86 inserts with equal facility downwardly through the opposite end of the opening 102 (which was formerly the bottom) for locking interconnection therein.

It will be appreciated that in the configuration of the modified camera support 10', the components may be trimmed by rotating and pivoting the monitor bracket 22, the electronics package 28 and battery 32 about the modified upright body 12' and/or the offset tubular body 67, to any desired, convenient, suitable, circularly oriented position, simply by first loosening the fasteners 60, 62, 68, 64 and 65 and then retightening when the parts are positioned at a desired circularly adjusted orientation. Again, the camera may be readily utilized in the low mode simply by inverting the camera support 10 and re-inverting the monitor 20 as before, hanging the camera from the mounting plate 16 (which is now the lowest part of support 10), and repositioning the gimbal just above the newly-determined center of gravity.

The preferred embodiments of the present invention as illustrated are preferably provided with a plurality of indicating scales of a conventional type such as engraved discs and rings, which are placed adjacent to such pivotal and rotatable adjustment points as the mounting rings 42, 44, the split ring clamp 65, pivotal connection 24, the rotatable connection 52, pivot clamps 54, 55, and the split ring clamp 66. The scales will indicate the angular orientation in all axes of the monitor 20, the electronics package 28, the battery 32, etc. by reference to the respective indicator lines permanently inscribed down the front of the body 12 (or 12') and on the mounting block 46 and the pivoting clamps 54, 55 as appropriate. These scales and marks will serve to help achieve and repeat a balanced condition more quickly as the equipment is set up, or changed back and forth from one type of operation to another The requisite operations for trim can be appreciated from a study of FIGS. 8 and 9 and the following guidelines:

Before mounting the camera:
1. Set all scales and indicators 104, 106, 108, 109 to "O" which will be factory arranged to provide a true fore and aft alignment of the monitor 20 and battery 32, and the correct position of the center of gravity fore and aft in the center of body 12. Test this condition by balancing the support 10 on the center of the cap or plug 30 as shown. Note that if the monitor is swung forward (dotted lines), the battery must be swung back (dotted lines) to keep the center of gravity exactly centered.

It is important to understand that a mis-trim of monitor and battery can be compensated by giving the camera the reciprocal mis-trim up above, but this has the effect of misaligning the axis between the true individual centers of gravity of the major masses in the system (camera and monitor/battery) which can cause a slight unintentional precession of the entire system when panning. In practice this is rarely noticed by the operator unless he is panning the camera independently of the monitor and battery. In this case he would notice an immediate inbalance in the system if the center of gravity of any of the individual major masses of the system falls anywhere other than along an imaginary line drawn through the axis of the body 12.

2. Next, mount the camera 18 onto mounting plate 16 so that its center of gravity is directly over the body 12 (this can be determined by holding the mounting plate 16 with both hands, one on either side of the body 12 and sliding the camera fore and aft until the camera support 10 hangs level.) Then lock the position of the camera with the conventional locking arrangements provided (not shown). Next, as shown in FIG. 8, tilt the camera support 10 and the camera 18 forward ninety degrees and hold it entirely by the gimbal 14 (or balance the gimbal ring on a pivot as shown), which has previously been loosened just enough so it can be moved back and forth along the body 12 until the gimbal is directly over the center of gravity of the camera and support and therefore the camera support 10 hangs in "neutral balance."

It has been found that a favorable condition for normal operation can be obtained by noting this neutral gimbal position and then raising it ½ inch above this point and locking it thereon. This provides a slight bottom heaviness which is easily overpowered for tilting moves. Assuming that the camera 18 is nearly centered side to side on the mounting plate 16, any remaining slight deviation in side-to-side balance can be compensated for by slightly loosening the split ring clamps 64, 65 and rotating the electronics package 28 and the attached battery 32 side to side until the support 10 hangs upright in the gimbal. It will be appreciated that any adjustment which puts the system out of balance, such as moving the monitor 20 to one side, can be compensated by the counter-adjustment of the appropriate other component.

It is true that any drastic re-alignment of monitor and battery or other similar components which balances them, for instance, ninety degrees offset from the camera, increases the likelihood of a slight precession during violent tilting moves, but these effects are generally minimal unless the monitor or the like is at the same time raised to a different horizontal plane than the battery. In this case, as in FIG. 9, even though the battery and the monitor are in static balance, the battery has a greater moment of rotational inertia than the monitor. It will lag behind during a violent tilt of the camera, which will cause a tendency for the camera to precess (in this case pan) to the right.

Although the present invention has been described with reference to the particular embodiments herein set forth, it is understood that the present disclosure has been made only by way of example and that numerous changes in the details of construction may be resorted to without departing from the spirit and scope of the invention. Thus, the scope of invention should not be limited by the foregoing specification, but rather only by the scope of the claims appended hereto.

What is claimed is:

1. In a mobile camera support system for securing a plurality of camera components during use, including a first component means and a second component means, an elongated support body having a camera body mounted near one end, and a gimbal means for attaching the support body to a carrying system, the improvement which comprises:
    means for attaching said first component means and said second component means to the support body;
    wherein said attachment means are capable of separate axial movement along the support body, and separate rotative movement about the support body; and
    wherein said first component means and said second component means are pivotally associated with said attachment means for separate rotation in azimuth with respect to said support body independently of each other and independently of the camera body.

2. The camera support system of claim 1 wherein the first adjustable means comprises a video monitor bracket having at least one mounting ring, the mounting ring being provided with locking construction to releasably secure the video monitor bracket to the tubular body.

3. The camera support system of claim 1 and a rotatable interconnection between the video monitor and the first adjustable means whereby the monitor may be located in an infinite number of positions relative to the camera mount.

4. The camera support system of claim 1 and a pivotal interconnection between the video monitor and the first adjustable means whereby the monitor may be located in an infinite number of positions relative to the camera mount.

5. The camera support system of claim 1 wherein the first adjustable means comprises at least one arm, the arm being offset from the axis of the body to space the video monitor away from the body.

6. The camera support system of claim 1 wherein the second adjustable means comprises a second arm and length adjusting means to vary the length of the second arm.

7. The camera support system of claim 1 and scale means on the body to measure the rotative orientation of at least one of the components relative to its immediate means of support.

8. The camera support system of claim 1 and third adjustable means to secure the electronics package to the body in spaced relationship from the camera mount, the third adjustable means being adapted to permit rotative adjustment of the electronics package relative to the body.

9. The camera support system of claim 8 wherein the electronics package is cylindrical and is coaxially secured to the body.

10. The camera support system of claim 8 wherein the third adjustable means comprises a threaded or bayonet connector and a threaded or bayonet socket.

11. The camera support system of claim 8 wherein the third adjustable means comprises a central bore, the bore being of size to receive a portion of the tubular body therein whereby the electronics package may be longitudinally and rotatively adjusted on the tubular body.

12. The camera support system of claim 8 wherein the second adjustable means comprises a second arm, the second arm interconnecting a camera equipment component to the electronics package.

13. The camera support system of claim 12 wherein the said camera equipment component is the battery.

14. The camera support system of claim 12 wherein the second arm includes a pivotal interconnection, the pivotal interconnection being provided with a locking clamp whereby the said camera equipment component can be secured in infinite pivoted positions relative to electronics package.

15. The camera support system of claim 8 and a connecting means adapted to interconnect the first adjustable means and the third adjustable means in fixed relative rotative position.

16. The camera support system of claim 15 wherein the connecting means comprises a floating clamp surrounding the first tubular body intermediate the said first and third adjustable means and adapted to clamp together a protruding boss from each of said adjustable means so that the first tubular body can be rotated freely relative to the said interconnected first and third adjustable means.

17. The camera support system of claim 8 wherein the third adjustable means is adapted to permit both axial and rotative adjustment of the electronics package relative to the body.

18. The camera support system of claim 1 wherein the second adjustable means interconnects a camera equipment component and the tubular body, the second adjustable means being provided with a clamp to secure the camera equipment component in an infinite number of rotated and axially adjusted position relative to the body.

19. The camera support system of claim 18 and means to pivot the camera equipment component relative to the body.

20. The camera support system of claim 1 wherein the gimbal means comprises a guiding flange to define a hand operating area.

21. The camera support system of claim 20 and second handle removably affixed to the gimbal means connection to the carrying system to facilitate steadying and positioning the said carrying system.

22. The camera support system of claim 1 and a second tubular body secured to the first tubular body in angular relation thereto, the second tubular body comprising a clamp secured about the first tubular body, the clamp being adapted to permit axial and rotative movement of the second tubular body relative to the first tubular body.

23. The camera support system of claim 22 wherein the electronics package comprises an internal bore, the electronics package receiving a portion of the second tubular body within the said bore.

24. The camera support system of claim 23 wherein the electronics package further comprises at least one clamp, the clamp securing the electronics package to the second tubular body in angular relationship to the axis of the first tubular body.

25. The camera support system of claim 22 wherein the second adjustable means is connected to the second tubular body and adapted to permit axial and rotative adjustment of the other camera equipment component relative to the second tubular body.

26. The camera support system of claim 25 wherein the second adjustable means comprises the electronics package.

27. The camera support system of claim 26 wherein the second adjustable means comprises the battery.

28. The camera support system of claim 1 wherein said first component means and said second component means are each independently pivotable about respective axis radially displaced from said elongated support body and transverse thereto.

29. The camera support system of claim 28 wherein said first component means is further pivotable about an axis radially spaced from said elongated support body but parallel thereto.

30. The camera system of claim 29 wherein the first component is rotatably connected to the elongated support body.

31. The camera system of claim 30 wherein the first component is rotatable in a horizontal plane about the elongated support body.

32. The camera system of claim 29 wherein the first component means is longitudinally adjustable relative to elongated support to a position closer or further remote to the camera body, said means is pivotable in a vertical plane to facelitate better viewing during camera tilt of all degrees, and said means is circularly adjustable in a horizontal plane about the longitudinal member.

33. The camera system of claim 1 wherein the first component means is a viewfinder means.

34. The camera system of claim 33 wherein the viewfinder means is an electronic viewfinder means.

35. The camera system of claim 34 wherein the viewfinder means is a TV monitor.

36. The camera support system of claim 1 wherein said axis about which said second component means is pivotable is located off-center with respect to said second component means.

37. The camera system of claim 36 wherein the first and second component means are rotatable through a ninety degree arc in an offset and opposite relationship with respect to the camera body.

38. The camera system of claim 1 wherein the second component means is a battery means.

39. The camera system of claim 1 which comprises an additional component means, an electronic package means.

40. The camera system of claim 1 wherein the first component is a viewfinder means and the second component is a battery means.

41. The camera system of claim 40 wherein the camera body is positioned closest to the ground as compared with the first component means, which is positioned further away from the ground than the camera body.

42. The camera system of claim 1 wherein the first component is a viewfinder means, the second component is a battery means, and an additional component means is an electronic package means.

43. The camera system of claim 42 wherein the electronic package is in a laterally adjustable position.

44. The camera system of claim 42 wherein the electronic package is securable to the elongated support means in a laterally adjustable position with respect to said body.

45. The camera system of claim 42 wherein the electronic package is securable to the elongated support means in a position upwardly and downwardly adjustable on the elongated body.

46. The camera support of claim 42 wherein the electronics package includes a central bore of size to overfit and slide upon the upright body, the electronics package being rotatably and longitudinally adjustable relative to the upright body.

* * * * *